(12) United States Patent
Iraschko

(10) Patent No.: US 9,441,685 B2
(45) Date of Patent: Sep. 13, 2016

(54) DISC BRAKE FOR A MOTOR VEHICLE AND BRAKE LINING

(71) Applicant: KNORR-BREMSE Systeme fuer Nutzfahrzeuge GmbH, Munich (DE)

(72) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/212,929

(22) Filed: Mar. 14, 2014

(65) Prior Publication Data

US 2014/0196992 A1     Jul. 17, 2014

Related U.S. Application Data

(63) Continuation of application No. PCT/EP2012/067926, filed on Sep. 13, 2012.

(30) Foreign Application Priority Data

Sep. 14, 2011 (EP) .................................... 11181212

(51) Int. Cl.
    *F16D 65/00*          (2006.01)
    *F16D 55/226*        (2006.01)
    (Continued)

(52) U.S. Cl.
    CPC .......... *F16D 65/0056* (2013.01); *B60T 1/065* (2013.01); *F16D 55/226* (2013.01); *F16D 55/2262* (2013.01); *F16D 65/092* (2013.01);
    (Continued)

(58) Field of Classification Search
    CPC ............ F16D 65/0056; F16D 65/092; F16D 65/095; F16D 65/0972; F16D 2055/0008; B60T 1/065
    See application file for complete search history.

(56) References Cited

U.S. PATENT DOCUMENTS 4,316,530 A * 2/1982 Gehlen ............... F16D 55/2262
                                                                                                                                         188/264 G
4,335,806 A     6/1982   Lüpertz
(Continued)

FOREIGN PATENT DOCUMENTS

CN            1156497 A      8/1997
CN       101427044 A      5/2009
(Continued)

OTHER PUBLICATIONS

International Preliminary Report on Patentability (PCT/IB/326) and (PCT/IB/373) dated Mar. 27, 2014, including Written Opinion (PCT/ISA/237) (nine (9) pages).
(Continued)

*Primary Examiner* — Vishal Sahni
(74) *Attorney, Agent, or Firm* — Crowell & Moring LLP

(57) ABSTRACT

A disc brake for a motor vehicle and a corresponding brake lining are provided. The disk brake includes a brake caliper straddling a brake disc, at least one brake lining with a lining carrier plate and friction lining, and a brake carrier fixed to the vehicle having carrier flanges supporting the lining carrier plate on entry and exit sides. The entry-side carrier flange and the adjacent lining carrier plate support surface interlockingly engage with one another, and the exit-side carrier flange and a corresponding contact contour of the lining carrier plate form a support surface inclined at an angle relative to the Y-axis in certain areas or at least in the radially highest area of the lining support on the brake carrier.

19 Claims, 13 Drawing Sheets

(51) Int. Cl.
*F16D 65/095* (2006.01)
*F16D 65/092* (2006.01)
*B60T 1/06* (2006.01)
*F16D 55/00* (2006.01)
*F16D 65/02* (2006.01)

(52) U.S. Cl.
CPC ..... *F16D 65/095* (2013.01); *F16D 2055/0045* (2013.01); *F16D 2065/026* (2013.01)

(56) References Cited

U.S. PATENT DOCUMENTS

| | | | | |
|---|---|---|---|---|
| 4,444,296 | A | * | 4/1984 | Marianu ............... F16D 65/095 188/196 R |
| 4,940,119 | A | | 7/1990 | Kondo et al. |
| 5,022,500 | A | * | 6/1991 | Wang .................... F16D 55/226 188/71.1 |
| 5,467,847 | A | | 11/1995 | Antony et al. |
| 6,039,155 | A | | 3/2000 | Demoise, Jr. |
| 2008/0105500 | A1 | * | 5/2008 | Iraschko ............... F16D 65/095 188/72.1 |
| 2009/0236187 | A1 | | 9/2009 | Bach et al. |
| 2014/0196993 | A1 | * | 7/2014 | Iraschko ............... F16D 55/226 188/73.32 |

FOREIGN PATENT DOCUMENTS

| | | |
|---|---|---|
| DE | 29 26 818 A1 | 3/1981 |
| DE | 32 05 001 A1 | 8/1983 |
| DE | 10 2007 006 472 A1 | 11/2007 |
| DE | 10 2008 013 514 A1 | 9/2009 |
| EP | 0 641 949 A1 | 3/1995 |
| EP | 0 641 949 B1 | 5/1997 |
| EP | 1 234 994 A2 | 8/2002 |
| EP | 1 637 759 A1 | 3/2006 |
| EP | 1 637 759 B1 | 10/2007 |
| GB | 2 056 062 A | 3/1981 |
| GB | 2 056 602 A | 3/1981 |
| GB | 2 114 691 A | 8/1983 |
| GB | 2 163 500 A | 2/1986 |

OTHER PUBLICATIONS

Chinese Office Action issued in counterpart Chinese Application No. 201280045070.8 dated Jul. 27, 2015 with English-language translation (eight (8) pages).
International Search Report dated Dec. 18, 2012 with English translation (six (6) pages).
German-language European Search Report dated Feb. 27, 2012 with partial English translation (six (6) pages).
Written Opinion (PCT/ISA/237) dated Dec. 18, 2012 with English translation (twelve (12) pages).
German-language third-party filing in a post-grant opposition proceeding in counterpart European Application No. 11181212.9 dated May 25, 2016 (sixteen (16) pages).

* cited by examiner

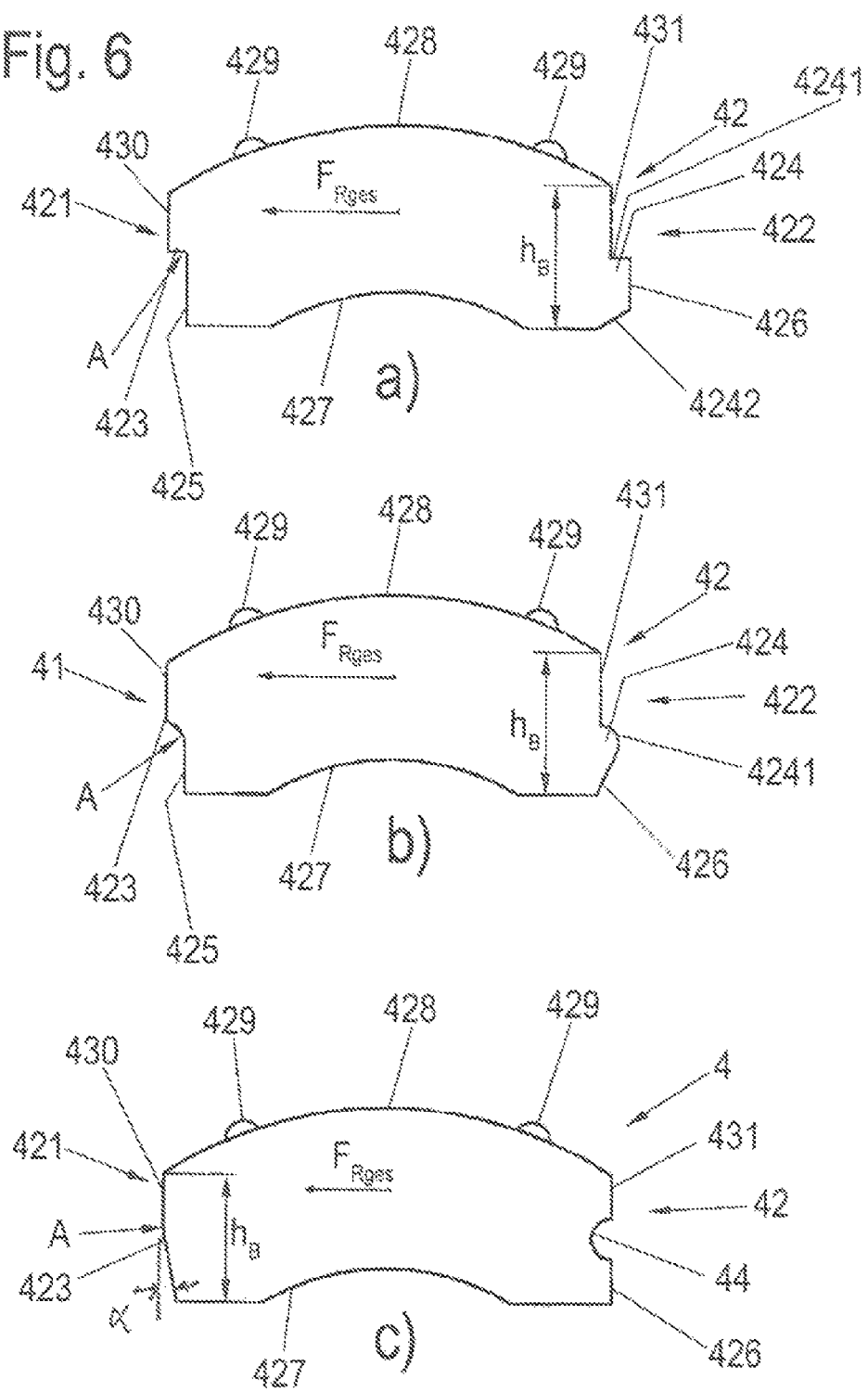

DISC BRAKE FOR A MOTOR VEHICLE AND BRAKE LINING

CROSS REFERENCE TO RELATED APPLICATIONS

This application is a continuation of PCT International Application No. PCT/EP2012/067926, filed Sep. 13, 2012, which claims priority under 35 U.S.C. §119 from European Patent Application No. 11181212.9, filed Sep. 14, 2011, the entire disclosures of which are herein expressly incorporated by reference.

BACKGROUND AND SUMMARY OF THE INVENTION

The present invention relates to a disc brake of a motor vehicle and to a brake lining.

Generic disk brakes are composed substantially of a brake disc which rotates with a vehicle axle during operation, at least one or more brake linings arranged at one side or preferably at both sides of the brake disc, a brake caliper, and preferably a brake carrier which extends to one or both sides of the brake disc. The disc brake which has the brake carrier preferably has a sliding caliper which is movable relative to the brake carrier, or a pivoting caliper.

To ensure reliable functioning of the disc brake, it is necessary for the brake linings to be reliably guided and supported in the brake caliper or the brake carrier.

The generic known brake carrier (and thus also the brake carrier according to the invention) has for this purpose preferably on each side of the brake disc preferably two carrier lugs which are arranged one behind the other in the circumferential direction of the brake disc and which are connected to one another by at least one strut and which project radially from a frame and which laterally delimit a lining slot for receiving a brake lining. Here, according to the prior art, the lining slot is preferably furthermore formed so as to be open in the outward direction, such that the brake linings can be pushed into it radially from the outside. After being inserted, the brake linings are fixed radially by a hold-down bracket. A lining retention spring may optionally be provided, in particular one which is arranged and acts resiliently between the lining hold-down bracket and the brake lining.

The brake linings are subjected, during operation, to a multiplicity of loadings. The brake linings are subjected to high thermal loading and mechanical loading. Different loading states arise in the two operating states a) brake actuated and b) brake not actuated.

During an actuation of the brake, the brake lining is subjected to high pressure and transverse forces, wherein the brake lining has to perform the task of introducing transverse forces generated at the friction surface of the brake lining via the lining compound into a lining carrier plate, and from there into the brake caliper or the brake carrier. Here, the transverse forces acting on the brake lining are accommodated primarily by the exit-side carrier lug, that is to say the carrier lug situated at the front in the direction of travel of the brake disc.

Furthermore, the brake lining must convert the application force generated by the brake caliper into a pressure force which is distributed as uniformly as possible over the friction surface. For this purpose, the application force generated by the brake caliper must be converted into an areal load by the flexurally rigid lining carrier plate.

It is a problem that, owing to the limited installation space conditions, the frontal narrow sides or support surfaces of the lining carrier plate of the known brake lining which bear against the brake carrier cannot prevent a rotational movement of the brake lining during a braking process. Said rotational movement can have an adverse effect on the air play, that is to say the clearance between the friction lining and brake disc, and on the wear behaviour of the brake linings, in particular in the form of oblique wear and the clearance of the linings.

German patent publication no. DE 29 26 818 A1 is cited as prior art.

It is an object of the present invention to further develop a disk brake of the generic type in such a way that the above-described adverse effects on the operating behaviour can be substantially eliminated.

Here, the carrier lug which is situated at the rear in a main direction of rotation of the brake disc, that is to say the direction of rotation of the brake disc during forward travel of the motor vehicle, is referred to as the entry-side carrier lug.

Correspondingly, the carrier lug which is situated at the front in a main direction of rotation of the brake disc, that is to say the direction of rotation of the brake disc during forward travel of the motor vehicle is referred to as the exit-side carrier lug.

In this case, the exit-side carrier lug and the associated contour of the lining carrier plate have, in each case, at least in the region of the highest support point in the radial direction, a support surface which is inclined at an angle of inclination $\alpha > 0°$ relative to the Y axis, wherein said support surfaces are designed for abutment against one another during braking processes in the main direction of travel.

To prevent the brake lining from sliding away tangentially owing to the oblique position of the highest support point A, the angle of inclination is in this case preferably smaller than the sum of a force introduction angle and the arc tangent of a friction value $\mu_a$ at the support point on the exit-side carrier lug. Angles of inclination $\alpha$ of between 8° and 30° have proven to be particularly advantageous. Also, for ensuring that the lining does not slide away tangentially on the support of the carrier lug, values of between at least 8° and at most 30° for the angle $\alpha$ preferably emerge.

In the disc brake according to the invention, in which the entry-side carrier lug of the brake carrier of the disc brake and the support surface, which is adjacent thereto, of the lining carrier plate engage into one another, the brake lining is supported on the exit-side carrier lug at a support point which lies below a force action line which represents the total friction force.

The force distribution on both carrier lugs which can be attained in this way has an advantageous effect on braking behaviour.

Firstly, the brake lining is subjected to a resulting defined torque about a Z axis parallel to the axis of rotation of the brake disk. As a result of said torque, a support force is advantageously exerted on the carrier lug at the entry side, too, and said side of the brake carrier is thus also incorporated into the force flow during a braking process, resulting in turn in a more expedient force distribution or introduction being attained in the brake carrier. By contrast, the case of conventional brake carriers without entry-side support of the brake lining, a very large proportion of the lining support takes place at the exit-side carrier lug.

Advantageous, then, is the force distribution on both carrier lugs, which is more uniform than in the prior art, during a braking process, which is also contributed to significantly by the relatively low highest support point (in the Y direction).

This shall be explained on the basis of a first model study. In simplified form, to describe a lining, it is possible to assume a model of a ring segment which is short in the circumferential direction (that is to say the coverage angle φ in the circumferential direction is assumed, in simplified form, to be relatively small), for which there is a resulting force action line or a force action vector through the centre of gravity of the brake lining in the X direction (perpendicular to the brake disc axis of rotation). In FIG. 2 et seq., said force action vector, in the variants illustrated in the figures, lies radially exactly or approximately in the centre of the brake lining. By contrast, the exit-side support on the brake carrier takes place—in this regard see also FIGS. 3 and 4 and the further appended illustrations aside from FIG. 1—preferably and advantageously further inward, in the Y direction perpendicular to the brake disc axis, relative to the force action vector applied to the centre of gravity. This also applies to the figures in which no brake carrier is illustrated.

The highest support point A of the brake lining on the exit-side carrier lug in the Y direction particularly preferably has a spacing h to the force action line, which spacing amounts to at least 0.1 times the length of the brake lining in the direction of the force action line of the total friction force and/or between 0.1 and 0.25 times the width of the brake lining perpendicular to the direction of the force action line of the total friction force. In this way, the force introduction distribution is advantageous at the entry side too, which will be explained in more detail further below, especially advantageous.

It is furthermore particularly advantageous, according to one refinement of claim 1 which is however also to be considered to be an independent invention, for the exit-side carrier lug and the associated contour of the lining carrier plate to have, in each case, a support surface which is inclined at an angle of inclination α>0° relative to the Y axis, wherein said support surfaces are designed for abutment against one another during braking processes in the main direction of travel.

To prevent the brake lining from sliding away tangentially owing to the oblique position of the highest support point A, the angle of inclination is in this case preferably smaller than the sum of a force introduction angle and the arc tangent of a friction value $\mu_a$ at the support point on the exit-side carrier lug. Angles of inclination α of between 8° and 30° have proven to be particularly advantageous. Also, for ensuring that the lining does not slide away tangentially on the support of the carrier lug, values of between at least 8° and at most 30° for the angle α preferably emerge.

The studies discussed above apply to braking processes in the forward direction. In order that braking processes in the reverse direction are however also possible without functional impairment, the brake carrier lug which is oriented toward the entry side in the forward direction must have a minimum height. An advantageous rule here is that the height of the brake carrier lug should be greater than the height position of the action line, oriented in the circumferential direction, of the lining friction forces. It is in this way ensured that no additional turning-out torque is exerted on the brake lining by the support of the brake lining.

In one advantageous design variant of the present invention—which may be considered firstly to be a refinement of the above subject matter but also secondly to be an independent invention—the exit-side carrier lug of the brake carrier is formed so as to be lower than the entry-side carrier lug of the brake carrier. This refers in particular to the radial distance to the axis of rotation (Z axis) of the brake disc. The entry-side carrier lug, which is formed so as to be radially elevated in relation to the exit-side carrier lug, ensures in particular reliable retention and prevention of the brake lining turning out of the brake carrier at the entry side.

In particular, the entry-side carrier lug is higher than a point of intersection of the force action line with the entry-side carrier lug, which improves the support of the brake lining even during reverse travel.

According to a further design variant, the outlet-side carrier lug of the brake carrier and the support surface, which is adjacent thereto, of the lining carrier plate are formed such that the lining carrier plate can pivot out of the brake carrier, radially away from the axis of rotation of the brake disc, at the exit side. In this way, while a structural design of the brake carrier and lining carrier plate is provided which prevents a rotational movement of the brake lining, simple installation and removal of the brake lining is simultaneously possible. Here, the installation and removal of the brake lining in the brake carrier may be performed in a simple manner by means of a pivoting movement.

According to one advantageous design variant, the support surface of the lining carrier plate which is adjacent to the entry-side carrier lug has an offset which engages into an undercut, which corresponds to the offset, on the entry-side carrier lug. In this way, the brake lining is prevented from turning out at the entry side not only by the presence of adequate friction forces but rather also by the shaping of the lining carrier plate and of the entry-side carrier lug, as a result of which the redistribution of relatively high support forces at the entry side is also made possible. Particularly advantageous here is a positively locking engagement of the offset into the undercut on the entry-side carrier lug, for example by virtue of the entry-side carrier lug having a head piece which engages over the offset on that support surface of the lining carrier plate which is adjacent to the entry-side carrier lug.

According to a further particularly preferred design variant, the lining carrier plate is, as a result of the design of the respective offsets, formed so as to be asymmetrical about a mirror axis which extends centrally through the brake lining and which runs through the axis of rotation of the brake disc. This, too, yields numerous advantages. As a result of the entry-side guidance, which acts in the radial direction, of the brake lining, a rotational effect of the brake lining during a braking process is prevented. Furthermore, as a result of the asymmetry, an asymmetric arrangement of the friction compound of the brake lining is possible, for example in order to compensate oblique wear of the friction compound. Furthermore, as a result of the asymmetrical design, incorrect installation of the brake lining into the brake carrier is practically ruled out. The undercut extends preferably as a projection in the direction of the main direction of rotation of the brake disc and is engaged under by the lining carrier plate at the entry side, such that the brake lining cannot be removed from the brake carrier directly radially relative to the brake disc central point.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the figures, expressions such as top, bottom, left, right, front, rear etc. relate substantially to the exemplary illustration used in the respective figures and the position of the disc brake, of the lining carrier plate and of the brake carrier in the figures. In other installation positions, the coordinate system used for the description moves conjointly.

In a Cartesian coordinate system, the Z axis lies parallel to the brake disc axis of rotation (at C, see FIGS. 4a and 5), the X axis runs perpendicular to the brake disc axis of rotation (at C, see FIG. 4a) through the brake disc axis of rotation or parallel to said straight line, and the Y axis runs perpendicular to the X axis and to the Z axis. The Y axis furthermore preferably runs through the centre of gravity of the brake lining approximately in the centre of the lining slot (in the circumferential direction).

Figure 2:
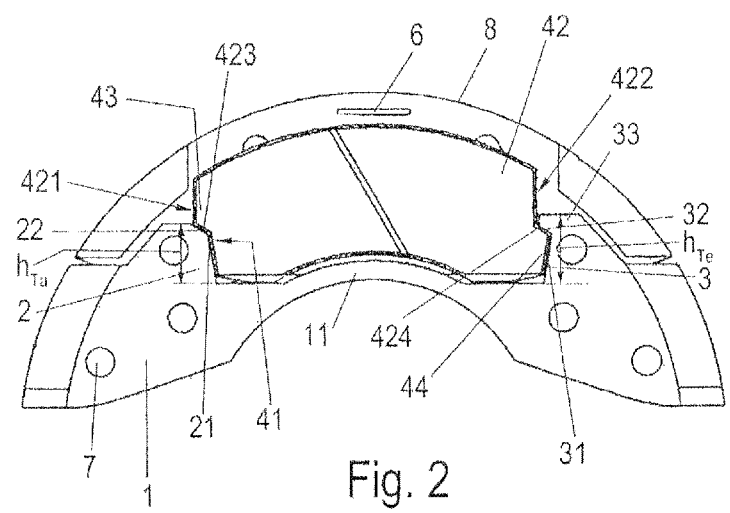
FIG. 2 shows a side view of a first design variant of a brake carrier according to the present invention with brake lining installed therein.
Figure 10:
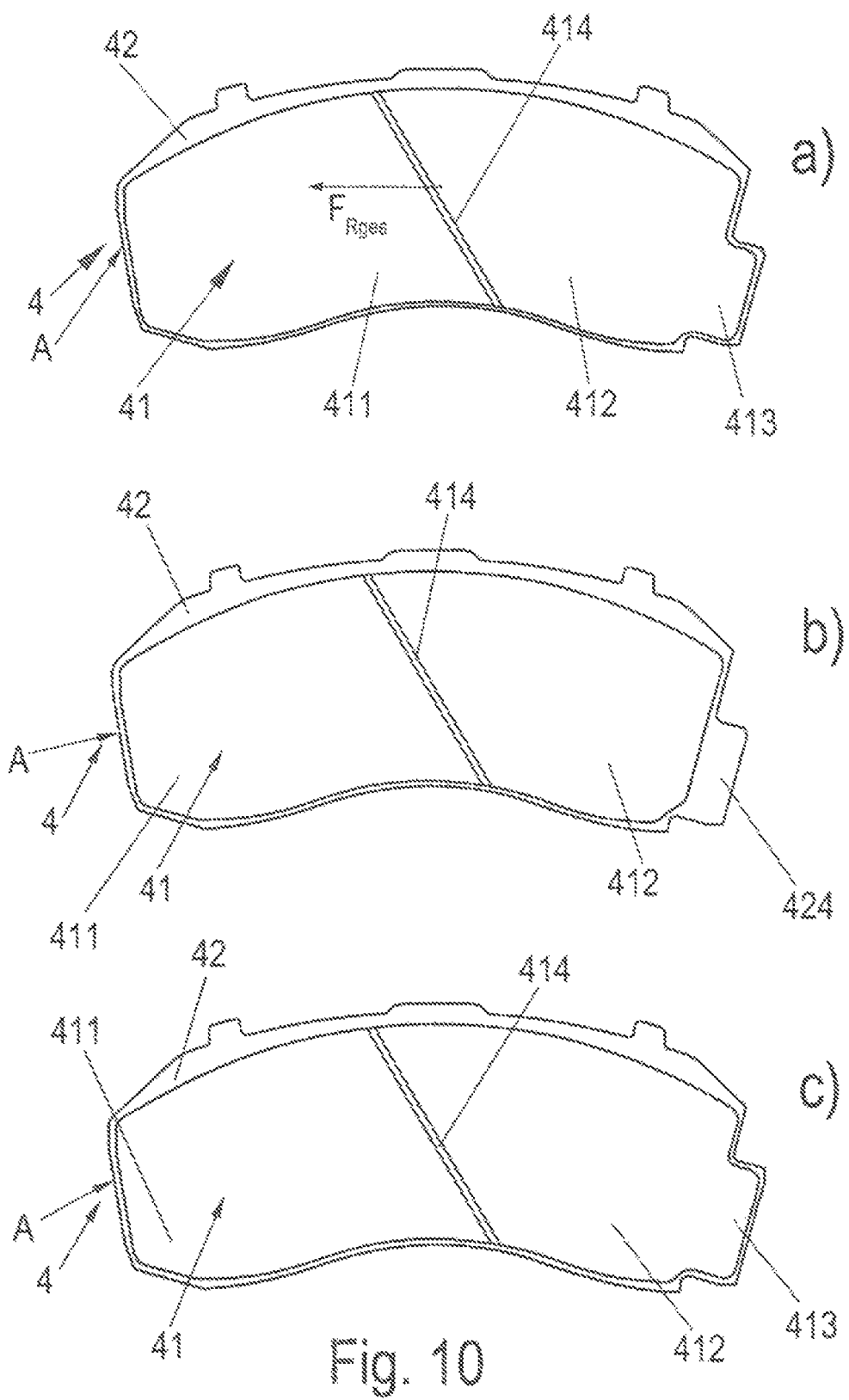

FIG. 2 shows a detail of a disc brake in a schematic illustration. Here, the reference numeral 42 denotes a lining carrier of a brake lining 4, to the rear side (not visible in FIG. 2) of which is fastened a friction lining 41 (visible in FIGS. 5, 7 or 10). The lining carrier 42 of the brake lining 4 is mounted on a brake carrier 1 which is mounted in a static manner on the vehicle, and said lining carrier is held in the brake carrier 1 at the brake caliper side by means of a lining retention bracket 6.

Here, the brake carrier 1 may be in the form of a separate component, as shown here, or in the form of an integral constituent part of a brake caliper 8. For the fastening of the brake carrier 1 to a vehicle axis, said brake carrier is conventionally provided with bores 7 into which can be inserted screws or bolts which hold the brake carrier on the vehicle axle. Some other support element for the retention and/or support of the brake lining 4 is also conceivable.

Figure 4A:
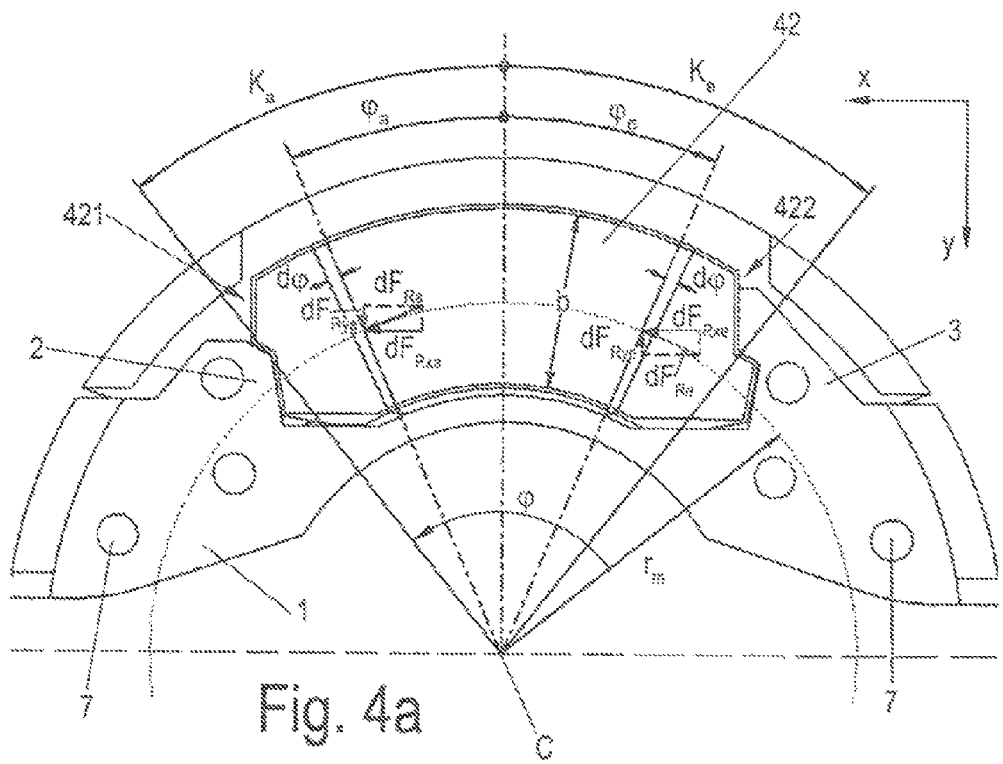
FIGS. 4a to 4d show side views of the brake carrier and of the brake lining from FIG. 2 with a schematic illustration of the brake disc and forces acting on various points of the brake carrier and/or of the brake lining.

As shown in FIGS. 4a, b and 7, the brake carrier 1, in the manner of a frame, spans or engages over a radially outer portion of the brake disc 5 and is composed substantially of two carrier lugs 2, 3 which are connected to one another by bridge parts 11, which are arranged one behind the other in a plane parallel to the brake surface of the brake disc 5 and which support the lining carrier plate 42 of the brake lining 4 laterally, that is to say at the entry side and the exit side.

Figure 7:
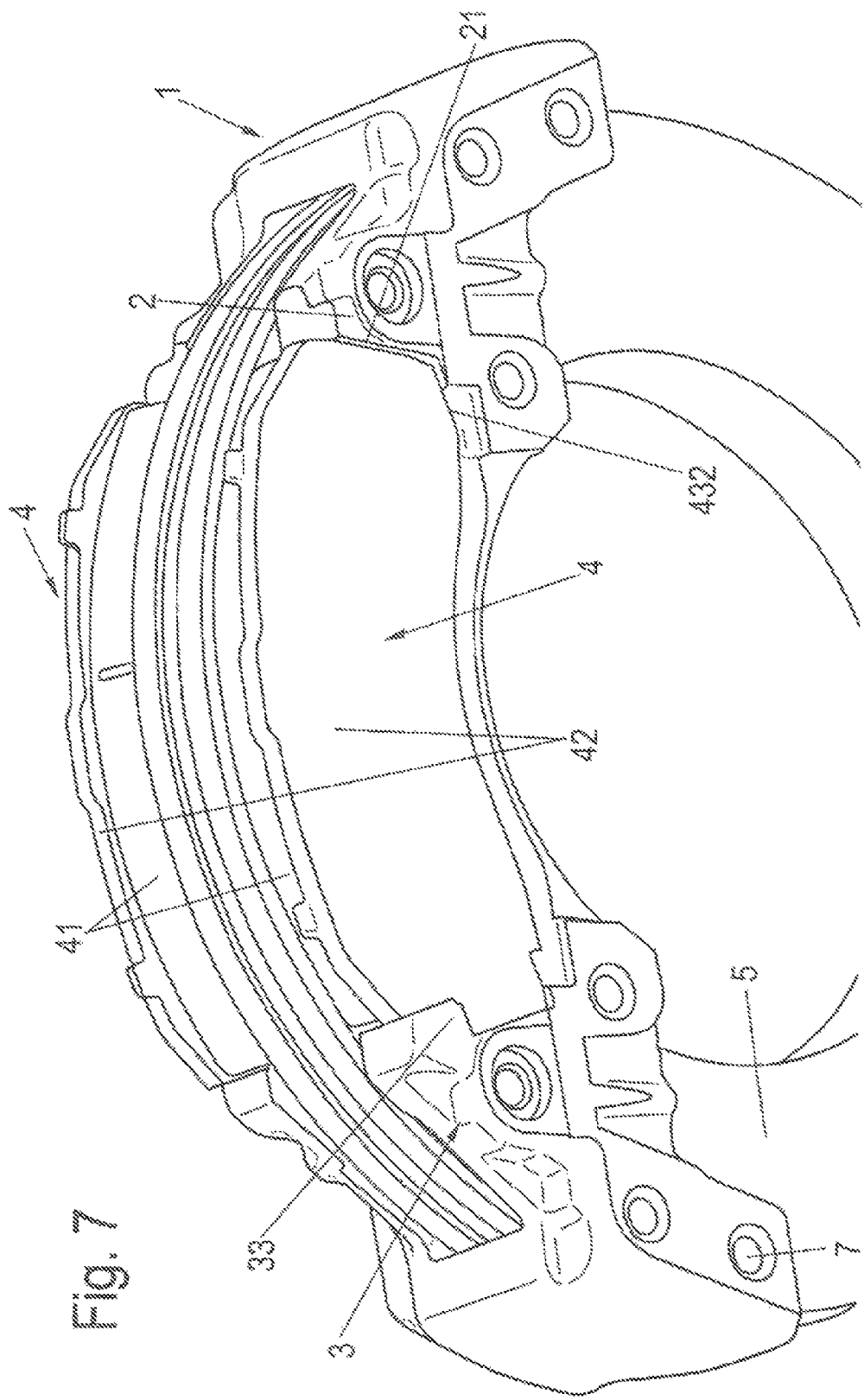
FIG. 7 shows a perspective view of a second design variant of a disc brake according to the present invention.

The brake carrier 1 shown in FIG. 7 spans the brake disc both at the action side and also at the reaction side. Also conceivable is a design variant of the brake carrier for retention of only the action-side or only the reaction-side brake lining. In said alternative design variant, the brake lining 4 arranged on the other side of the brake disk 5 is preferably held directly in the brake caliper 8. The brake caliper 8 is preferably a brake caliper arranged displaceably on the brake carrier.

Here, in the inserted state, the lining carrier plate 42 of the brake lining 4 rests without play or virtually without play in the lining slot, which is formed by the carrier lugs 2, 3 and by the bridge part 11 connecting these and which is partially open in the radially outward direction, of the brake carrier 1.

Figure 1:
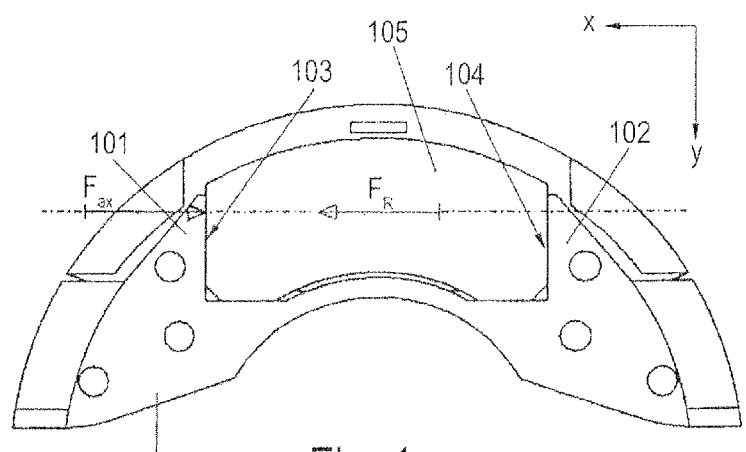
FIG. 1 shows a side view of a brake lining according to the prior art held in a brake carrier.

Here, by contrast to the disc brakes according to the prior art, as shown in an example in FIG. 1, the entry-side carrier lug 3 of the brake carrier 1 is not formed as a carrier 102 with a rectilinear support surface 104 facing towards the brake lining, but rather has an undercut 32 which receives an offset 424 on that support surface 422 of the lining carrier plate 42 which is adjacent to the entry-side carrier lug 3 of the brake carrier 1.

The undercut 32 and the offset 424 on that support surface 422 of the lining carrier plate 42 which is adjacent to the entry-side carrier lug 3 of the brake carrier 1 are formed here such that the brake lining 4 is pivotable about a pivot axis, which is parallel to the axis of rotation C of the brake disc 5 (shown in FIG. 4a), counter to a main direction of rotation HDR of the brake disc 5. Here, the undercut 32 extends as a projection in the direction of the main direction of rotation HDR of the brake disc 5 and is engaged under by the lining carrier plate 42, in particular by the abovementioned offset 424 on the entry side, such that the brake lining 4 cannot be removed from the brake carrier 1 directly radially relative to the brake disc central point C.

The exit-side carrier lug 2 of the brake carrier 1 and the support surface 41, which is adjacent thereto, of the lining carrier plate 42 are correspondingly formed such that the brake lining 4 is pivotable about a pivot axis, which is parallel to the axis of rotation C of the brake disc 5, counter to the main direction of rotation HDR of the brake disc 5. Accordingly, the brake lining 4 is held in the brake carrier 1 in such a way that, during installation and removal, a pivoting movement or a combined pivoting and radial movement is required, wherein during the removal of the brake lining 4, the radial movement takes place after the brake lining 4 is pivoted out of the undercut 32, and during installation of the brake lining 4, the radial movement takes place before the brake lining 4 is pivoted into the undercut 32 of the entry-side carrier lug 3. In this way, simple installation and removal of the brake lining 4 into and out of the brake carrier 1 is ensured.

As can be seen in FIG. 2, that support surface 41 of the lining carrier plate 42 which is adjacent to the exit-side carrier lug 2 of the brake carrier 1 has, for this purpose, an offset 43 which engages at least partially over the carrier lug 2. Here, the arrangement and configuration of the offsets 43, 44 of the lining carrier plate 42 with the friction lining 41 arranged thereon and of the undercut 32 of the brake carrier 1 is such that both the lining carrier plate 42 and also the brake carrier 1 preferably take on an asymmetrical form, which is advantageous both for the installation and removal of the brake lining and also for improved support of the brake lining or of the lining carrier plate 42 on the brake carrier 1.

Here, the pivot axis about which the brake lining 4 is pivotable lies preferably in the region of that support surface 422 of the lining carrier plate 42 which is adjacent to the entry-side carrier lug 3 of the brake carrier 1, close to a head region 33 of the entry-side carrier lug 3, preferably within 20 mm (<=20 mm) of the head region 33 of the entry-side carrier lug 3.

In the brake carriers and lining carrier plates according to the prior art, the brake carrier 100 (shown in FIG. 1) is formed with respective entry-side and exit-side carrier lugs 101, 102 which support the lining carrier plate 105. For the installation or removal of the carrier plate 105, the latter is pushed vertically into the gap between the two carrier lugs 101, 102, wherein the carrier lugs 101, 102 extend up to the radially outer edge or almost as far as the edge of the lining retention carrier 105. Here, both the inner surfaces of the carrier lugs 101, 102 and also the support surfaces 103, 104, which are adjacent thereto, of the carrier plate 105 are formed as planar surfaces. The exit-side carrier lug 101 in particular must in this case absorb a high concentration of forces at the upper end, which is associated with a very high loading and deformation of the carrier lug and with an unfavourable force distribution in the brake carrier 100 and in the lining retention carrier 105 of the brake lining.

Figure 3:
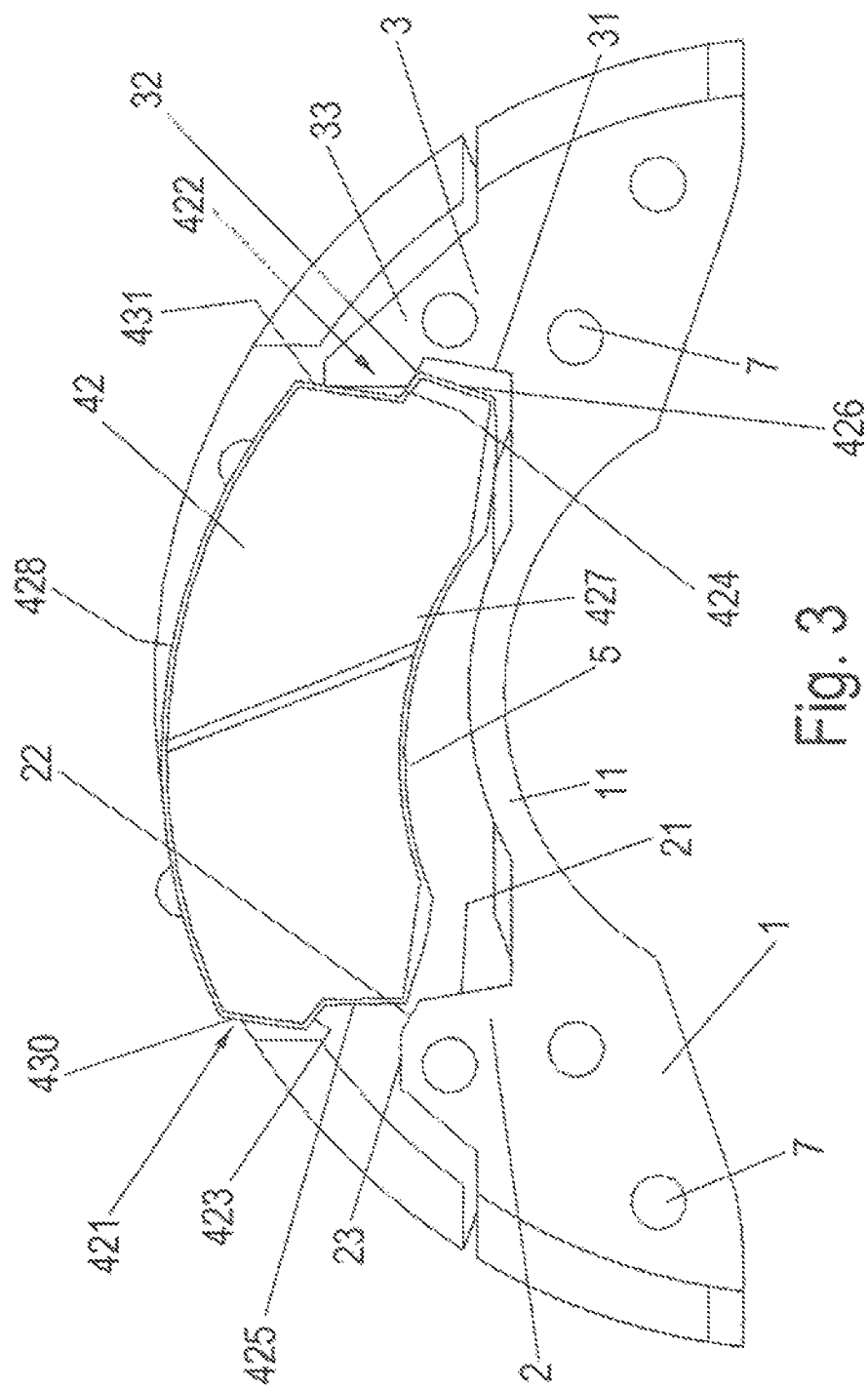
FIG. 3 shows a side view of the brake carrier and of the brake lining from FIG. 2 with the brake lining pivoted for the purpose of mounting or dismounting.
Figure 4B:
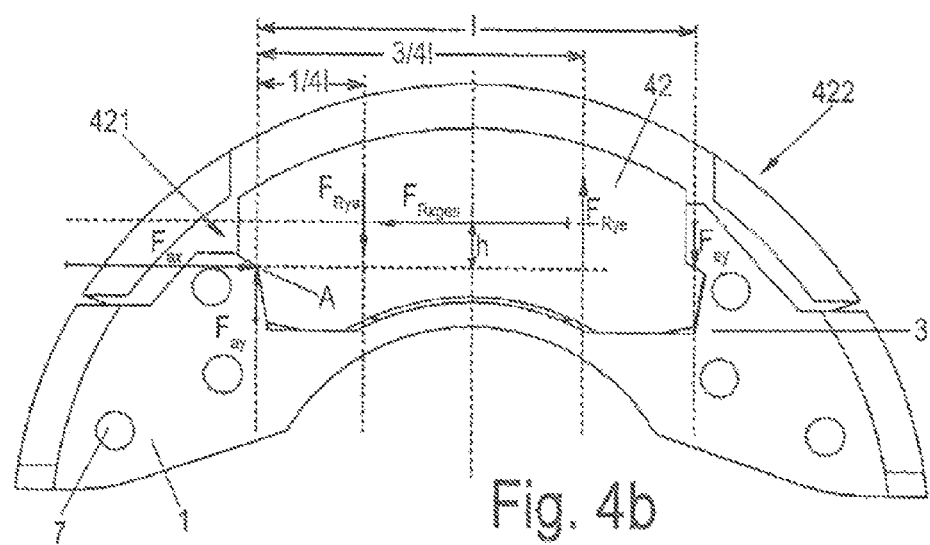

By contrast, as shown in FIGS. 2, 3 and 4a to 4d, in particular the exit-side carrier lug 2 is of lower or flatter form, such that an upper support point A of the lining retention carrier 42 on the outlet-side carrier lug 2 lies not at the upper end of the support surface 421 but rather radially below a force action line $F_{Rxges}$ which represents the total friction force acting on the brake lining 4, as shown in particular in FIG. 4b. Here, said force action line $F_{Rxges}$ lies radially at the height of the centre of gravity of the brake lining. On the brake lining, said support point is situated approximately in the centre or below the centre of the support surface 421. As a result, during a braking process, the lining retention carrier 42 of the brake lining 4 is acted on with a defined torque about the Z axis. As a result of said torque a support force is generated which acts on the undercut 32 and the offset 424 at the entry-side carrier lug 3, too, and therefore the entry side of the brake carrier 1 is also incorporated into the force flow during a braking process.

The exit-side carrier lug 2 and the entry-side carrier lug 3 have, at the foot of the respective carrier lug, a support surface 21, 31 which run parallel to one another or preferably, as illustrated in FIG. 2, diverge at an acute angle with respect to a straight line which is parallel to the y axis of the coordinate system defined further below.

Here, the length of said support surfaces 21, 31 which laterally partially enclose the lining retention carrier 4 amounts to preferably approximately half of or less than the height $h_B$ of the lining carrier plate 42, in order firstly to permit the pivoting of the lining carrier plate 42 into and out of the brake carrier 1 and secondly to keep the torque acting on the exit-side carrier lug 2 during a braking process as low as possible.

Above the support surface 21 of the exit-side carrier lug 2, the support surface 21 is angled away from the lining carrier plate 42 so as to form an oblique surface 22, correspondingly to the configuration of the offset 43 on the support surface 41 of the lining carrier plate 4.

Above the support surface 31 of the entry-side carrier lug 3, the support surface of the lining carrier plate 42 is angled inward so as to form the undercut 32, corresponding to the configuration of the offset 44 on the entry-side support surface 42 of the lining carrier plate 4.

FIG. 3 shows the particularly simple mounting and dismounting of the lining with the lining carrier plate 42 into or out of the brake carrier 1. As can be clearly seen here, it is possible by a simple pivoting movement for the lining carrier plate 42 to be moved out of engagement with the undercut 32 on the head 33 of the entry-side carrier lug 3.

FIGS. 4a to 4d show, in addition to the components, force-representing arrows of the forces acting on the various points of the components. Here, C denotes the axis of rotation of the brake disc 5, which is defined simultaneously as the Z axis of a Cartesian coordinate system. The X axis and Y axis of said coordinate system are the horizontal dashed line (X axis) and the vertical dashed line (Y axis) which intersect orthogonally at C.

Considering more closely the forces on the brake lining 4 in the plane, and in particular no longer considering a simplified short coverage angle but rather a coverage angle φ of the lining in the circumferential direction which is slightly larger (and which, as viewed in the radial centre, is preferably greater than 25°, particularly preferably greater than 35°), the following applies (see FIG. 4a):

For the entry-side half of the lining:

In the x direction (as viewed in a Cartesian coordinate system with a) the disc axis of rotation as the Z axis, b) a Y axis which is perpendicular thereto and which intersects the Z axis; and c) an X axis which perpendicularly intersects the Y axis but which does not intersect the Z axis):

$$dF_{Rxe} = p \cdot b \cdot r_m \cdot \mu \cdot \cos\varphi \cdot d\varphi$$

$$F_{Rxe} = \int_0^\kappa p \cdot b \cdot r_m \cdot \mu \cdot \cos\varphi \cdot d\varphi$$

$$F_{Rxe} = [p \cdot b \cdot r_m \cdot \mu \cdot \sin\varphi]_0^\kappa$$

$$F_{Rxe} = p \cdot b \cdot r_m \cdot \mu \cdot (\sin\kappa - \sin 0),$$

wherein
p: Brake lining surface pressure
b: Lining width
$r_m$: Friction radius
μ: Lining friction coefficient
φ: Angle covered in the entry or exit direction
κ: Angle covered in the entry or exit direction the point of contact of the entry-side and exit-side carrier lug
$F_{Rxe}$: Lining friction force component in the x direction, entry lining side The friction radius $r_m$ is assumed to lie in the centre of the brake disc or of the brake lining in the radial direction.

The lining friction forces acting in the x direction must be accommodated by the exit-side brake carrier lug 2.

In the y direction:

$$dF_{Rye} = p \cdot b \cdot r_m \cdot \mu \cdot \sin\varphi \cdot d\varphi$$

$$F_{Rye} = \int_0^\kappa p \cdot b \cdot r_m \cdot \mu \cdot \sin\varphi \cdot d\varphi$$

$$F_{Rye} = [-p \cdot b \cdot r_m \cdot \mu \cdot \cos\varphi]_0^\kappa$$

$$F_{Rye} = p \cdot b \cdot r_m \cdot \mu \cdot (\cos 0 - \cos\kappa)$$

where $F_{Rye}$: Lining friction force component in the y direction, entry lining side The lining friction forces acting in the y direction cause the brake lining to be pulled out of the brake carrier slot.

For the exit-side lining half, the following applies:

In the x direction, the relationship can be transferred without amendment from the entry-side lining half owing to the identical force action direction.

The same relationship as above applies in the y direction, but with a reversed sign. Here, the forces cause the brake lining to be pushed into the brake carrier slot.

$$F_{Rya} = p \cdot b \cdot r_m \cdot \mu \cdot (\cos\kappa - \cos 0)$$

where $F_{Rya}$: Lining friction force component in the y direction, exit lining side Owing to this, there is a resulting asymmetrical force action on the brake lining in the y direction.

The total lining friction force acting in the x direction is:

$$F_{Rxges} = F_{Rxe} + F_{Rxa}$$

where:

$F_{Rxa}$: Lining friction force component in the x direction, exit lining side $F_{Rxges}$: Total lining friction force in the x direction Said force must be accommodated by the exit-side carrier lug 2 alone.

Considering now the force and moment equilibrium about the Z axis at a point A at the contact point of the exit-side carrier lug (FIG. 4b), taking into consideration the relationships determined above, the following equations are obtained:

$$\Sigma M_{(A)} = 0 = F_{ey} \cdot l - F_{Rxges} \cdot h - F_{Rya} \cdot 1/4 l - F_{Rye} \cdot 3/4 l$$

$$\Sigma F_{(x)} = 0 = F_{ax} - F_{Rxges}$$

$$\Sigma F_{(y)} = 0 = F_{ay} - F_{Rya} - F_{Rye} - F_{ey}$$

where $F_{Rya} = -F_{Rye}$ it follows that:

$$\Rightarrow F_{ey} = F_{Rxges} \cdot h/l + 1/2 F_{Rye}$$

where:

$F_{ey}$: Support force on the entry-side carrier lug in the y direction $F_{ay}$: Support force on the exit-side carrier lug in the y direction l: Lining length of the brake lining 4 h: Spacing from the force action line to the support point (A) on the exit-side carrier lug 2

From said equation, it emerges surprisingly that, through corresponding configuration of the brake carrier 1, a support force can be generated at the entry side too.

To achieve this, it is advantageously provided that the brake lining 4 in the brake carrier 1 be prevented from turning out at the entry side. This may be achieved for example by means of a projection, which engages into the brake carrier 1, on the brake lining 4 (see FIG. 2).

Said equation, which contains the ratio h/l, likewise shows that it is surprisingly and advantageously possible, by means of a radially relatively low radial support point A at the exit side which can be easily realized in particular by virtue of the exit-side carrier lug 2 being lower than the entry-side carrier lug, for the support force at the entry-side carrier lug 3 to be increased. (h should be as large as possible; the support point A is in particular the outermost/highest support point A in the radial direction).

Through the described measures, a more expedient force distribution in the brake carrier 1 is attained. Conventional brake carriers without entry-side support of the brake lining have a high concentration of the lining support forces in the exit-side carrier lug.

The lining entry-side friction force component acting in the y direction must, in the case of conventional brake carriers, be introduced into the caliper bearing primarily by the frictional contact between the lining carrier plate and the brake caliper or the thrust pieces. The lining-entry-side friction force components lead to a high loading of the caliper bearing. To prevent premature wear or failure, relatively massive dimensioning, which thus takes up a large amount of installation space, is therefore required.

It is furthermore possible that, if there is insufficient adhesion between the brake lining and the brake caliper or the thrust pieces (such as for example in the presence of grease or oil), the brake linings can turn out, resulting in a malfunction of the brake.

Figure 6:
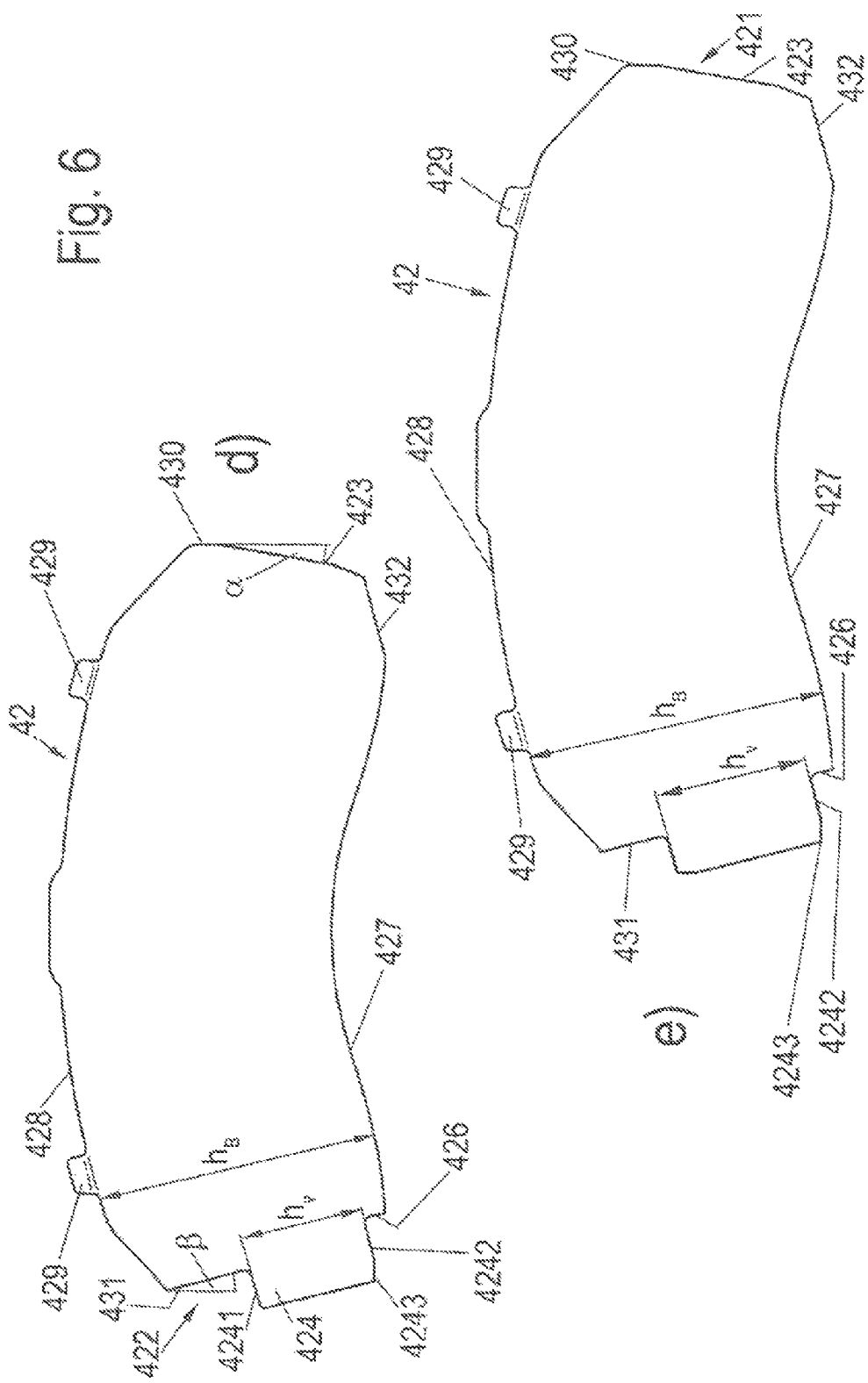
FIGS. 6a to 6c show different design variants of the shaping of a brake lining according to the present invention.

As described above, the brake lining 4 should be suspended at the entry side in the brake carrier 1. To ensure simple mounting and dismounting, the removal and installation should thus take place by means of a pivoting movement of the brake lining 4. To permit this, the exit-side carrier lug 2 and the associated contour of the lining carrier 42 have an inclined support surface, as shown in FIGS. 3 and 6.

The angle of inclination $\alpha$ of the exit-side support lug 2 with respect to the Y axis however cannot be selected arbitrarily. Firstly, the minimum oblique position is determined by the installation and removal conditions. Secondly, the maximum admissible oblique position is predefined by the adherence to the self-locking limit. If the self-locking limit were exceeded, the brake lining 4 would slide away tangentially. The self-locking limit is significantly dependent on the lining geometry, on the friction conditions at the lining support and on the direction of force introduction between the brake lining 4 and brake carrier 1.

Figure 4C:
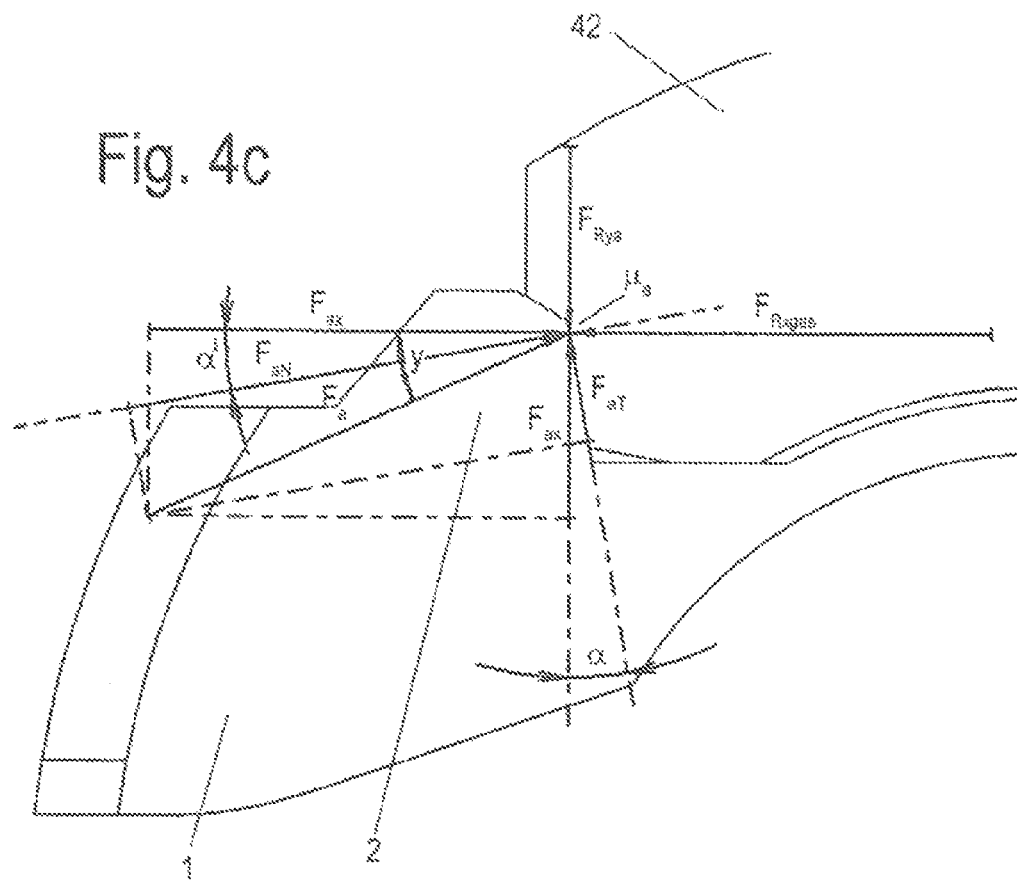

The physical relationships are illustrated in FIG. 4c and are determined by the following equations.

For the force engagement angle $\gamma$, the following applies:

$$\gamma = \arctan \frac{F_{Ray}}{F_{Rxges}}$$

$$\text{where } F_a = \frac{F_{ax}}{\cos\gamma} \Rightarrow$$

$$\cos(\alpha - \gamma) = \frac{F_{aN}}{F_{ax}} \cdot \cos\gamma \Rightarrow$$

$$F_{aN} = F_{ax} \cdot \frac{\cos(\alpha - \lambda)}{\cos\gamma}$$

$$\text{where } F_{aN} = \frac{F_{aR}}{\mu_a} \text{ and}$$

$F_{aR} = F_{aT}$ (condition for self-locking), it follows that:

$$\alpha = \gamma + \arctan\mu_a$$

where:

$\gamma$: Force engagement angle on the exit-side carrier lug 2

$\alpha$: Angle of inclination of the support surface on the exit-side carrier lug 2

$F_a$: Total support force on the exit-side carrier lug $F_{aN}$: Normal force on the exit-side carrier lug (perpendicular to the support surface)

$F_{aT}$: Tangential force on the exit-side carrier lug (parallel to the support surface)

$\mu_a$: Friction value at the lining support on the exit-side carrier lug

The above equation defines the self-locking condition of the angle of inclination α of the exit-side carrier lug 2 as a function of the force introduction angle γ and the friction $\mu_a$ at the support point.

To ensure that the lining 4 does not slide away tangentially on the support of the carrier lug 2, the angle α must be selected to be considerably smaller than that calculated by the above relationship.

Taking into consideration realistic friction conditions ($\mu_a$=0.1 to 0.2) on the carrier lug and the normal dimensions for friction linings in heavy goods vehicles, values of between a minimum of 8° and a maximum of 30° preferably emerge for the angle α.

Figure 4D:
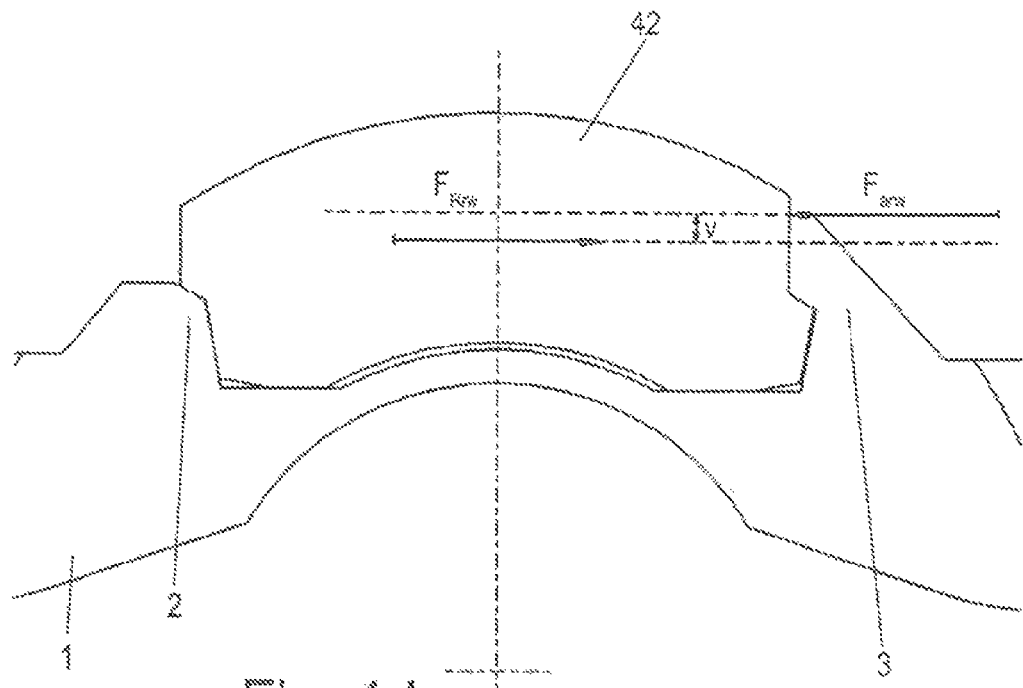

The examinations set out above apply to braking processes in the forward direction. However, in order that braking processes in the reverse direction are also possible without functional impairment, the brake carrier lug 3 oriented toward the entry side in the forward direction must have a minimum height. The situation common in the case of conventional brake carriers applies here. It is advantageous for the height of the brake carrier height to be greater than the radial height position of the action line, oriented in the circumferential direction, of the lining friction forces. It is thereby ensured that no additional turning-out torque is exerted on the brake lining by the support of the brake lining. The offset dimension v of the two action lines is shown in FIG. 4d.

Since, in the case of road-going vehicles, reverse braking operations are generally carried out considerably less frequently and with relatively low force, the lining guidance for reverse braking operations can thus be implemented more simply than that for forward braking, without functional impairment.

Owing to the above-specified demands for forward braking operations and the demand with regard to lining installation and removal and the demand with regard to the lining support during reverse braking operations, there is a resulting system-induced asymmetrical geometry of the brake lining 4.

Typical features of the asymmetrical lining and brake carrier geometry are a relatively low support lug on the brake carrier side oriented toward the exit side, an oblique position of the lining support of the exit-side carrier lug, wherein the angle of inclination is preferably 8°<=α<=30°, engagement of the brake lining 4 and brake carrier lug 3 into one another at the entry side of the brake carrier 1 (for example by a projection on the brake lining and a corresponding recess on the carrier lug 3) and a relatively tall support lug 3 on the brake carrier side oriented toward the entry side.

The following variables are also defined in FIG. 4b: $F_{ey}$: reaction force at the entry side, l: lining length, $F_R$: friction force of the brake lining, h: spacing of the force action line to the lining support; $F_{ax}$: lining support force; $F_{ay}$: reaction force at the exit side.

It is important that, as a result of the shaping according to the invention of the carrier lugs 2, 3 and of the support surface 41, 42 of the lining carrier plate 42, no longer only the exit-side carrier lug 2 but rather also the entry-side carrier lug 3 contributes to the support of the lining carrier plate 42 during a braking process.

Figure 5:
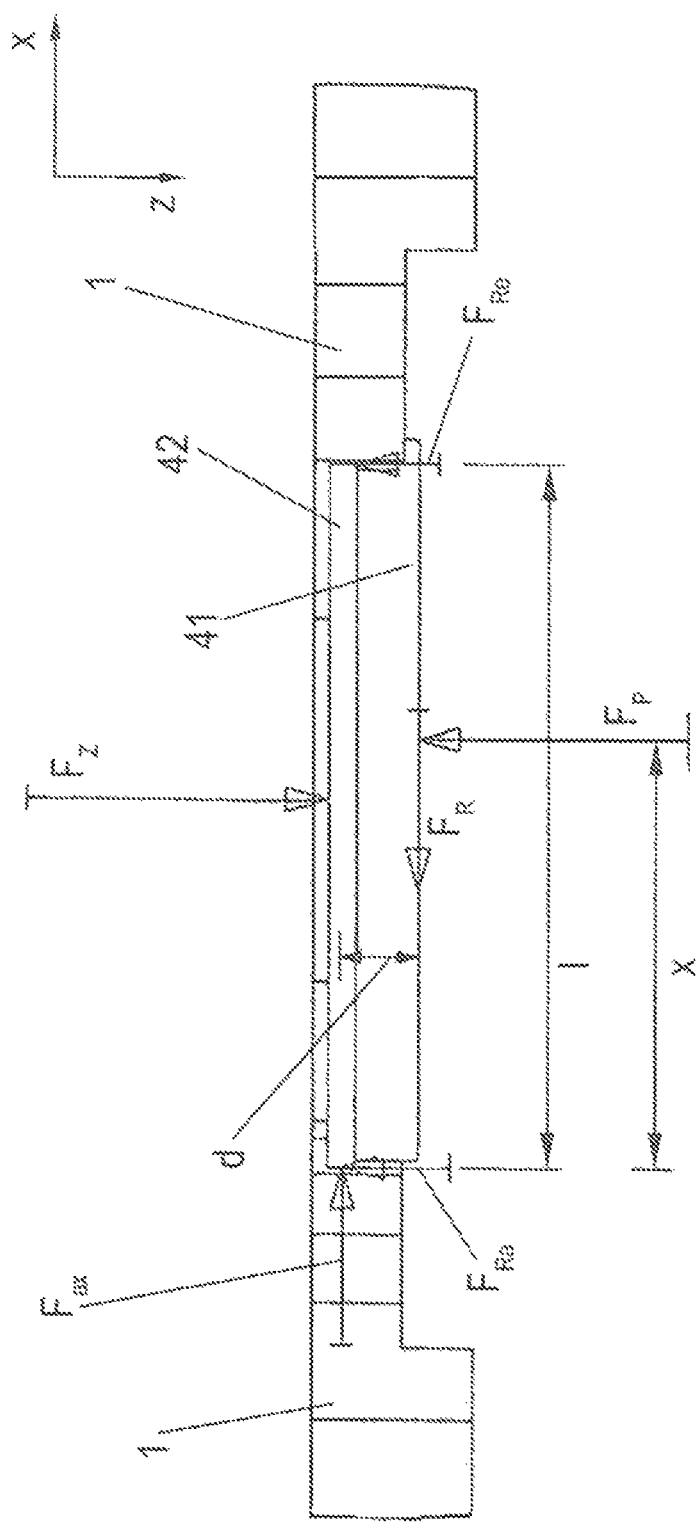
FIG. 5 shows a plan view of the brake carrier and the brake lining from FIG. 2 with illustration of the forces acting on various points.

With regard to the forces and torques on the brake lining about the vertical axis (y axis) during a displacement of the brake lining under the action of force in the x direction, illustrated in FIG. 5, the following equations apply:

$$\Sigma F_{(z)}=0=F_{Ra}-F_z+F_P+F_{Re} \qquad 1.$$

$$\Sigma F_{(x)}=0=F_{ax}-F_R \qquad 2.$$

$$\Sigma M_{(A)}=0=F_R \cdot d-F_P \cdot x-F_{Re} \cdot l+F_z \cdot l/2 \qquad 3.$$

$F_z$: Application force
$F_P$: Lining contact-pressure force against the brake disc
$F_{Ra}$: Friction force at the exit side
$F_{Re}$: Friction force at the entry side
d: Lining thickness
x: Spacing of the application force action line For the asymmetry of the force action on the brake lining or on the lining carrier plate 42, the following thus applies:

$$x = \frac{F_z \cdot \frac{1}{2} - F_{Re} \cdot l + F_R \cdot d}{F_P}$$

For $F_{Re}$=0 (friction force at the entry side) and $F_{Ra}$=0 (friction force at the exit side) and d=0 (lining friction force and support force in the same plane), the following applies:
$F_z=F_P$ from eq. 1

$$x = \frac{F_z \cdot \frac{1}{2}}{F_z} \Rightarrow x = \frac{1}{2}$$

(Ideal state, with uniform force distribution in the lining)

For a conventional brake lining without friction force on the entry-side brake lining carrier lug:

$$x = \frac{F_z \cdot \frac{1}{2} + F_R \cdot d}{F_P}$$

For a brake lining 4 with friction force on the entry-side brake carrier lug 3, the relationship derived above applies:

$$x = \frac{F_z \cdot \frac{1}{2} - F_{Re} \cdot l + F_R \cdot d}{F_P}$$

A brake carrier 1 having a friction force at the entry-side brake carrier lug 3 thus has a force distribution which is more expedient, by the term (FRel), than a brake lining without entry-side friction force.

As a result of the offsets 423, 424 at the support surfaces 421, 422 of the lining carrier plate 42 and the undercut 32 on the entry-side carrier lug 3, the lining carrier plate 42 can be inserted without play or substantially without play into the brake carrier 1.

Also conceivable are further design variants of the lining carrier plate 42 shown by way of example in FIGS. 6a to 6e and corresponding shapings of the carrier lugs 2, 3 of the brake carrier 1.

In FIG. 6a, a rectangular offset projection with support surfaces 423, 424 running parallel to the X axis are integrally formed on the lining carrier plate in each case at the entry side and at the exit side, wherein the entry-side surface 4241 of the offset 424 is supported on a correspondingly aligned undercut 32 of the entry-side carrier lug 3, and the exit-side support surface 423 is supported on the exit-side carrier lug 2.

In the design variant shown in FIG. 6b, the offset projections 423, 424 are formed as roundings which are supported on correspondingly shaped undercuts of the entry-side carrier lug 3 and on a correspondingly shaped rest surface 22 of the exit-side carrier lug 2.

In the design variant shown in FIG. 6c, on the entry side 422, the offset 424 is formed as a semi-circular protrusion. The entry side 421 of the lining carrier plate 42 is in the form of two rectilinear surfaces, which run at an angle with respect to one another, for support on the exit-side carrier lug 2.

Figure 9:
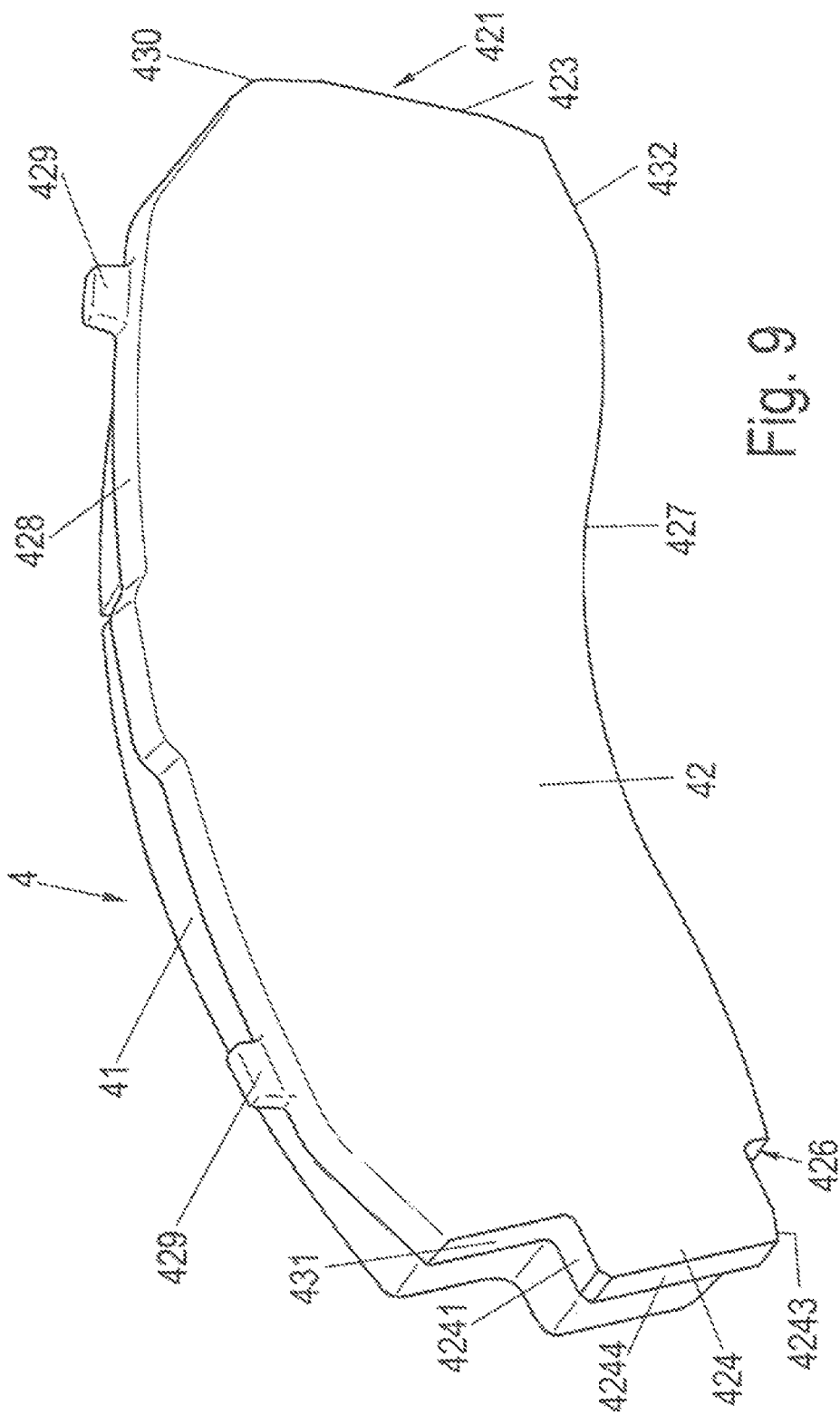
FIG. 9 shows a perspective view of the brake lining of the design variant of the disc brake shown in FIG. 7, FIGS. 10a to c show different design variants of the shaping of the friction lining of a brake lining according to the present invention.

The lining carrier plate 4 shown in FIGS. 6d, 6e and 9 is characterized in that, at the entry side, a rectangular offset projection 424 is arranged on a side surface 422 which exhibits an outward overhang at an acute angle β, which side surface can be pivoted into a correspondingly formed undercut 32 of the entry-side carrier lug 3. Here, the height hV of the offset 424 of FIG. 6d is smaller than the height hV of the offset 424 of FIG. 6e. At the exit side, the side surface 421 of the lining carrier plate 4 is formed centrally as a side surface 423 which exhibits an outward overhang at an acute angle α.

It is preferable, in order to allow the lining carrier plate 4 to pivot more easily into the undercut 32 of the entry-side carrier lug 3, for the edge region 430 which adjoins the top side 428 and the edge region 432 which adjoins the underside 427 of the lining carrier plate 4 to be of slightly flattened design.

Likewise, a surface part 4242, which (in the installed state of the brake lining 4) points in the direction of the axis of rotation of the brake disc 5, of the rectangular offset or offset projection 424 is provided with a flattened portion 4243 in order to facilitate the pivoting movement of the brake lining 4 out of engagement with the brake carrier 1.

Here, in one preferred design variant, the offset 424 is integrally formed on the lining carrier plate 42. It is alternatively also conceivable for the offset 424 to be fastened as a separate component to the lining carrier plate 42.

Figure 8:
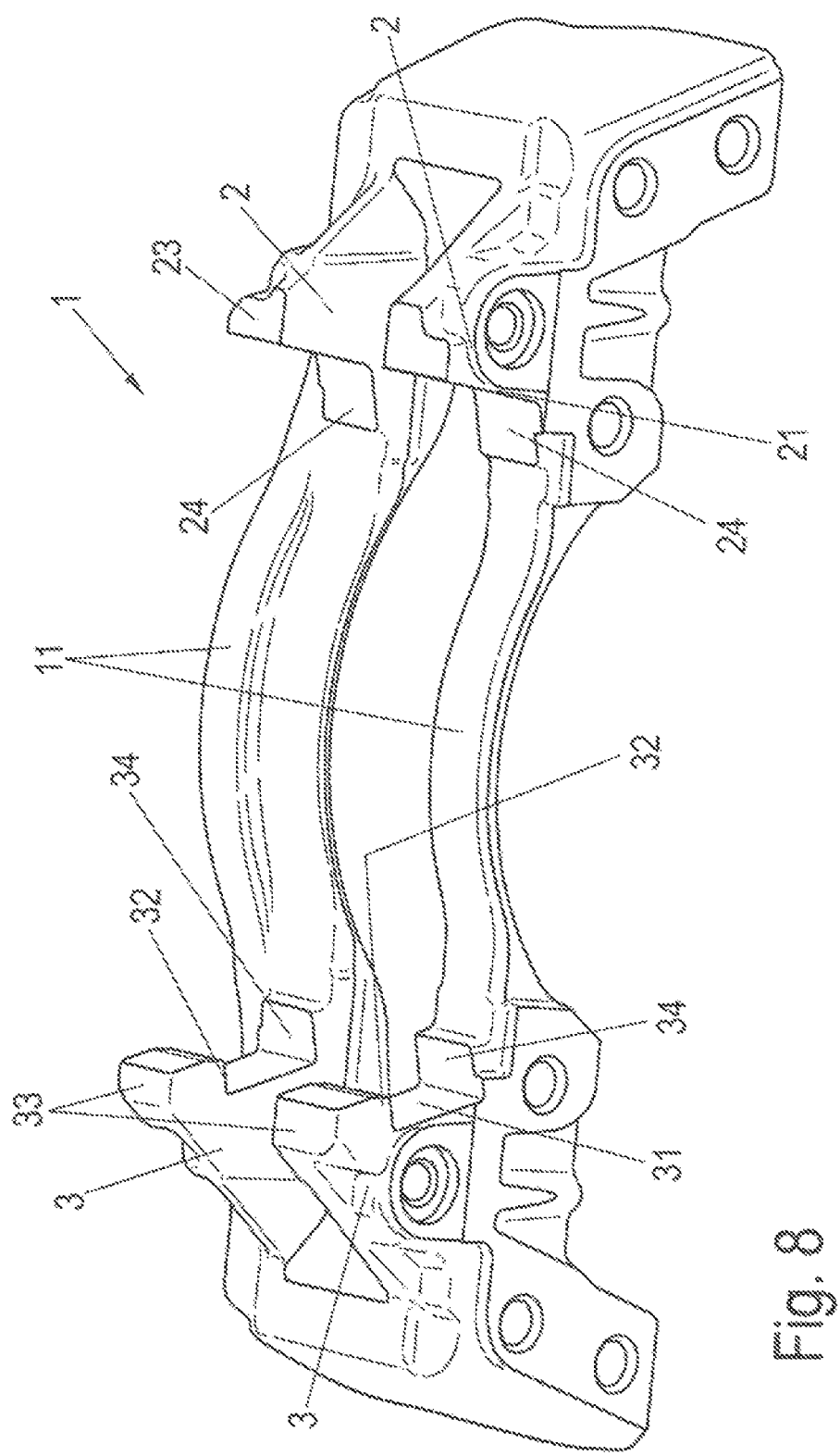
FIG. 8 shows a perspective view of the brake carrier of the design variant of the disc brake shown in FIG. 7.

FIG. 7 shows a design variant of the brake carrier 1, which is designed for the brake linings 4 shown in FIGS. 6d and 6e, with two brake linings 4 inserted into the brake carrier 1. The brake carrier 1 is illustrated without the brake linings in FIG. 8. It is possible to clearly see the asymmetrical design of the brake linings and the design of those constituent parts of the brake carrier 1 which receive the brake linings 4, in particular the head 33 of the entry-side carrier lug 3 and the V-shaped spread of the brake lining slot, which is formed by the carrier lugs 2, 3, of the brake carrier.

The friction lining 41 which is arranged on the brake linings 4 is preferably shaped correspondingly to the asymmetrical form of the lining carrier plate 42, as shown in FIGS. 10a and 10c. The part 413, which covers the offset 424 of the lining carrier plate 42, of the friction lining 41 which is preferably divided into two parts 411, 412 is preferably integrally formed with one of the parts 412; however, in a design variant of the brake lining with a separately formed offset 424, said part 413 may also be mounted on the brake lining together with the offset 424. It is also conceivable for no friction lining to be applied to the offset 424, as shown in FIG. 10b.

Figure 11:
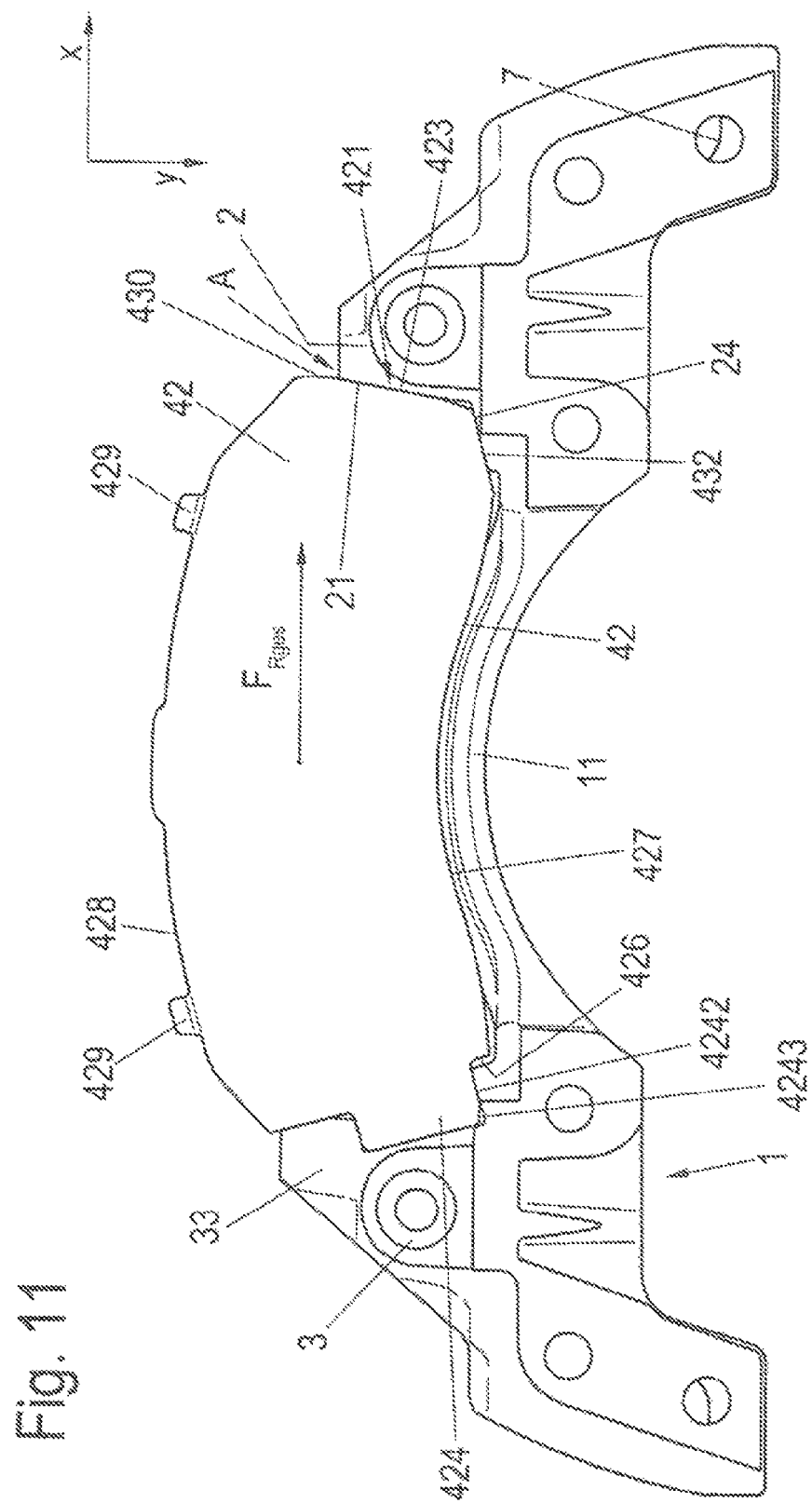
FIGS. 11 and 12 show further side views of design variants of a brake carrier according to the present invention with brake lining installed therein.
Figure 12:
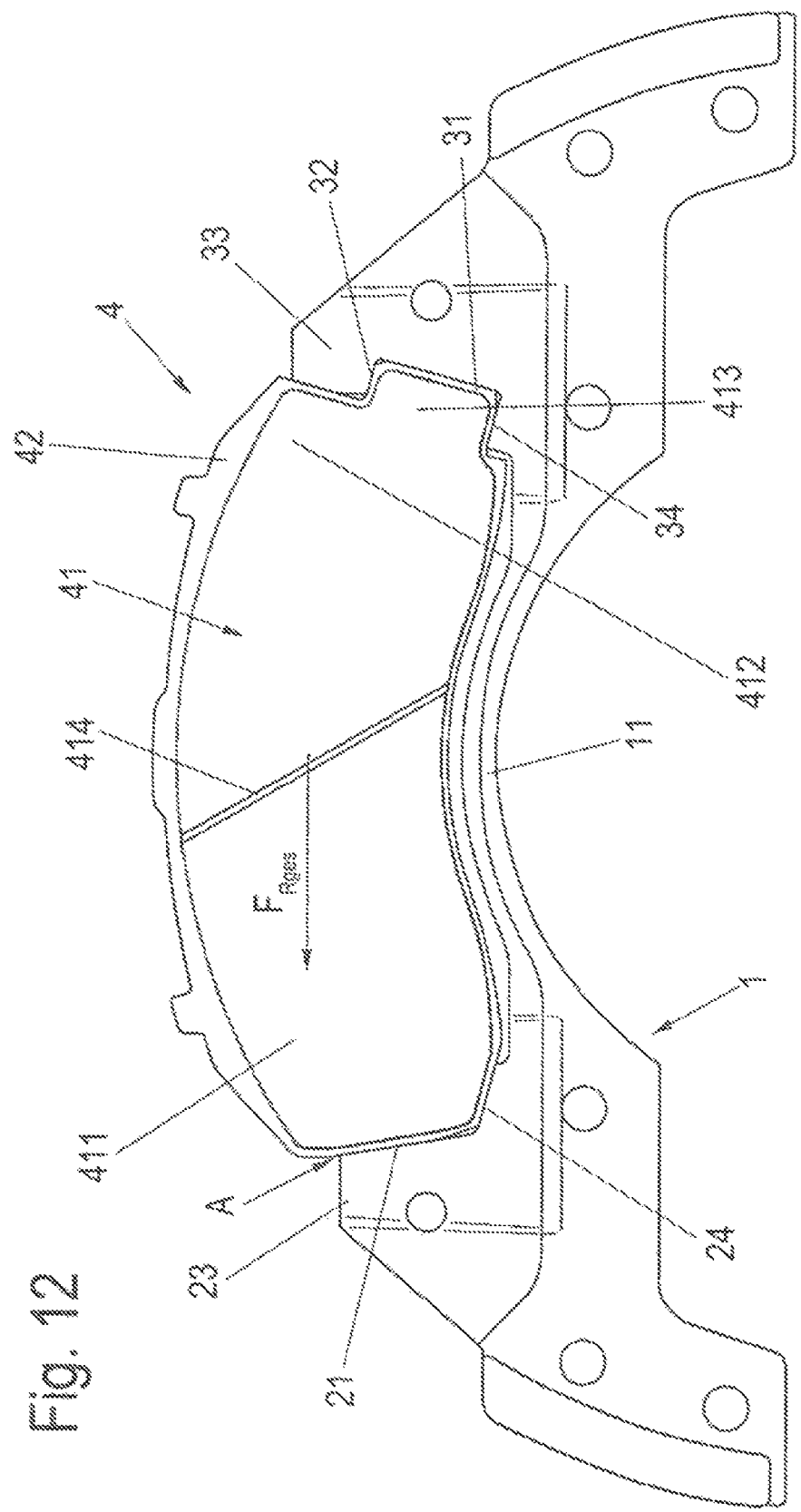

FIGS. 11 and 12 show plan views of the brake carrier 1 shown in FIG. 7 and of the brake lining 4, on the one hand showing the lining carrier plate 42 of the brake lining (FIG. 11) and on the other hand showing the friction lining 41 of the brake lining (FIG. 12). It is possible here, too, to clearly see that the exit-side carrier lug 2 is formed so as to be asymmetrical with respect to the entry-side carrier lug 3 of the brake carrier 1 about a mirror axis which extends centrally through the brake lining 4 and which runs through the axis of rotation C of the brake disc 5.

Therefore, with the lining carrier plates 4 and brake carriers 1 formed according to the invention, an improvement in force distribution is attained through frictionally locking support at the entry side and at the exit side. Furthermore, there is a more uniform introduction of the forces transmitted during a braking process from the brake lining 4 into the brake carrier 1, which is associated with a more uniform loading of the brake carrier 1 and of the brake caliper and of the fastening elements which fasten the brake to the axle which bears the brake carrier 1. Moreover, a reduction in rattling noises is attained as a result of more precise radial guidance of the brake lining 4 in the brake carrier 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Brake carrier
11 Bridge part
2 Carrier lug
21 Support surface
22 Rest surface
23 Top side
24 Support surface
3 Carrier lug
31 Support surface
32 Undercut
33 Head
34 Support surface
4 Brake lining
41 Friction lining
42 Lining carrier plate
421 Support surface
422 Support surface
423 Offset
424 Offset
4241 Top side
4242 Bottom side
4243 Flattened portion
4244 Side surface
425 Support surface
426 Support surface
427 Bottom edge
428 Top edge
429 Shoulder for lining retention spring
430 Edge region
431 Support surface
432 Support surface
5 Brake disc
6 Lining retention bracket
7 Bore
8 Brake caliper
100 Brake carrier
101 Carrier lug 102 Carrier lug
103 Support surface
104 Support surface
105 Lining carrier plate
C Axis of rotation, coordinate origin
A Force engagement point
HDR Main direction of rotation of the brake disc
$h_B$ Height of the lining retention plate
$h_{Te}$ Height of the entry-side carrier lug
$h_{Ta}$ Height of the exit-side carrier lug
v: Offset of the force action lines during reverse braking
x: Spacing of the lining contact-pressure force to the lining support point
$F_R$: Total lining friction force
$F_{Rrw}$: Lining friction force during reverse braking
$F_{arw}$: Lining support force during reverse braking
$F_Z$: Application force
$F_P$: Lining contact-pressure force
$F_{Ra}$: Friction force in the support surface of the exit-side carrier lug
$F_{Re}$: Friction force in the support surface of the entry-side carrier lug

What is claimed is:

1. A disc brake of a motor vehicle, comprising:
a brake caliper configured to straddle a brake disc;
a brake carrier configured to be fixed to the vehicle, and
at least one brake lining configured to be guided on the brake carrier, the at least one brake lining having a lining carrier plate and a friction lining on the lining carrier plate,
wherein
the brake carrier has carrier lugs arranged to support the lining carrier plate of the brake lining at an entry side and an exit side of the brake carrier,
the entry-side carrier lug of the brake carrier and a corresponding entry-side support surface of the lining carrier plate are configured to engage into one another, and
the exit-side carrier lug and an exit-side abutment contour of the lining carrier plate have opposing exit-side support surfaces inclined by an angle of inclination α with respect to a Y axis of the disc brake in at least one of regions of the opposing exit-side support surfaces and at least at a radially highest point of the lining support on the brake carrier, the Y axis being an axis of a coordinate system in which the axis of rotation of the brake disc is the Z axis, the Y axis extends perpendicular to the axis of rotation of the brake disc through a center of the brake lining when located on the brake carrier and the X axis is perpendicular to the Z axis and the Y axis, and
the exit-side carrier lug and the entry-side support surface are configured such that the lining carrier plate is removable from the brake carrier by pivoting the exit side of the brake lining away from the brake carrier in a direction radially away from the axis of rotation of the brake disc.

2. The disc brake according to claim 1, wherein
the angle of inclination α is smaller than a sum of a force introduction angle γ and an arctangent of a friction value $\mu_a$ at a support point A where the inclined exit-side support surface of the brake lining plate meets a lower exit-side surface of the brake lining plate aligned parallel to the Y axis.

3. A disc brake according to claim 2, wherein
the angle of inclination α is greater than or equal to 8° and less than or equal to 30°.

4. The disc brake according to claim 3, wherein
the brake lining is supported on the exit-side carrier lug at a support point A below a force action line $F_{Rxges}$ corresponding to a total friction force acting on the brake lining.

5. The disc brake according to claim 4, wherein
the exit-side carrier lug is lower than the entry-side carrier lug.

6. The disk brake according to claim 5, wherein
the support point A at the exit-side carrier lug has a spacing h below the force action line $F_{Rxges}$.

7. The disk brake according to claim 6, wherein
the spacing h of the support point A at the exit-side carrier lug to the force action line $F_{Rxges}$ is at least 0.1 times a length l of the brake lining in a direction of the force action line $F_{Rxges}$.

8. The disc brake according to claim 7, wherein
the entry-side carrier lug is higher than a point of intersection of the force action line $F_{Rxges}$ with the entry-side carrier lug.

9. The disc brake according to claim 8, wherein
a support surface of the lining carrier plate adjacent to the entry-side carrier lug of the brake carrier has an offset configured to engage into an undercut on the entry-side carrier lug.

10. The disc brake according to claim 9, wherein
the entry-side carrier lug of the brake carrier and the support surface of the lining carrier plate adjacent to the entry-side carrier lug are configured to engage into one another in a positively locking manner.

11. The disc brake according to claim 1, wherein
an arc angle covered by the friction lining in a circumferential direction of the brake disc when the brake lining is on the brake carrier is greater than 25°.

12. The disk brake according to claim 11, wherein
the arc angle is greater than 30°.

13. A brake lining for a disc brake, comprising
a lining carrier plate; and having fastened thereto
a friction lining on the lining carrier plate,
wherein
the lining carrier plate has lateral support surfaces for support against entry-side and exit-side inner walls of carrier lugs of a brake carrier of the disk brake,
at least one of the lateral support surfaces of the lining carrier plate has an offset for positively locking into one of the side inner walls of the carrier lugs, and
the lining carrier plate has an exit-side support contour for abutment against the exit-side inner wall of the brake carrier, and
an exit-side abutment contour of the lining carrier plate has an opposing exit-side support surface configured to oppose an opposing exist-side support surface of the exit-side carrier lug, the opposing exit-side support surfaces being inclined by an angle of inclination α with respect to a Y axis of the disc brake in at least one of regions of the opposing exit-side support surfaces and at least at a radially highest point of the lining support on the brake carrier, the Y axis being an axis of a coordinate system in which the axis of rotation of the brake disc is the Z axis, the Y axis extends perpendicular to the axis of rotation of the brake disc through a center of the brake lining when located on the brake carrier and the X axis is perpendicular to the Z axis and the Y axis, and the exit-side support surface of the lining carrier plate and the entry-side support surface are configured such that the lining carrier plate is removable from the brake carrier by pivoting the exit side of the brake lining away from the brake carrier in a direction radially away from the axis of rotation of the brake disc.

14. The brake lining according to claim 13, wherein the angle of inclination $\alpha$ is smaller than a sum of a force introduction angle $\gamma$ and an arctangent of a friction value $\mu_a$ where the inclined exit-side support surface of the brake lining plate meets a lower exit-side surface of the brake lining plate aligned parallel to the Y axis.

15. The brake lining according to claim 14, wherein the angle of inclination ($\alpha$) is greater than or equal to 8° and less than or equal to 30°.

16. The brake lining according to claim 15, wherein
a rectangular offset is formed on an entry-side side surface of the lining carrier plate, and
the entry-side rectangular offset is adjacent to a bottom side of the lining carrier plate.

17. The brake lining according to claim 16, wherein the rectangular offset is a shoulder on the entry-side lateral support surface.

18. The brake lining according to claim 16, wherein the rectangular offset is trapezoidal with a rectangular projection.

19. The brake lining according to claim 16, wherein the lining carrier plate is asymmetrical.

* * * * *